Dec. 13, 1932. P. A. BORDEN 1,890,494
VALVE DEVICE
Filed Sept. 25, 1931
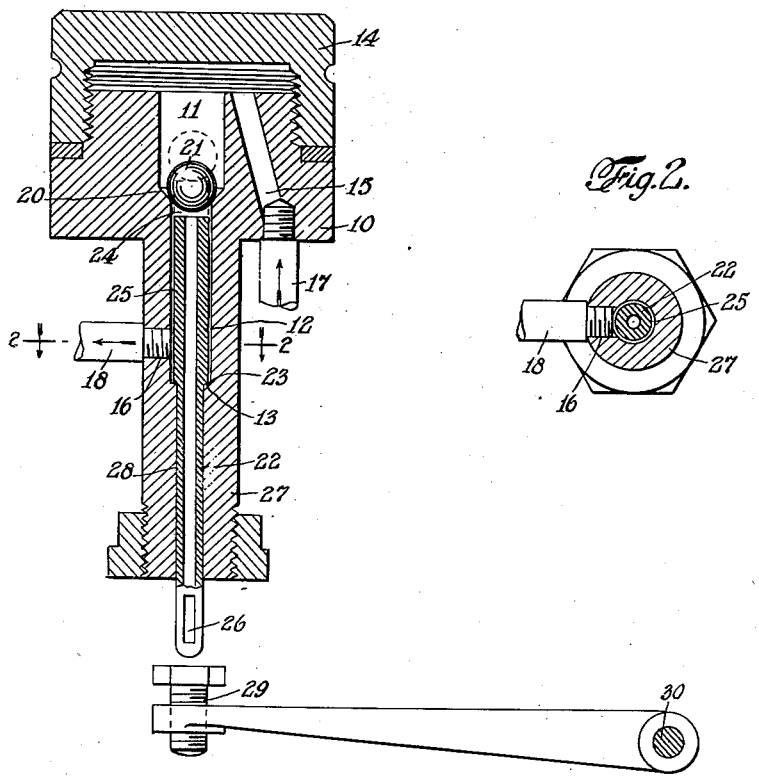
INVENTOR
PERRY A. BORDEN
BY
ATTORNEY Patented Dec. 13, 1932

1,890,494

UNITED STATES PATENT OFFICE

PERRY A. BORDEN, OF WATERBURY, CONNECTICUT, ASSIGNOR TO THE BRISTOL COMPANY, OF WATERBURY, CONNECTICUT, A CORPORATION OF CONNECTICUT

VALVE DEVICE

Application filed September 25, 1931. Serial No. 565,033.

The invention relates to valves for controlling the flow of a fluid as, for example, the valves adapted for use with diaphragm or "servo-motor" apparatus operating under the action of a fluid thereon as the same is supplied to or withheld therefrom by the control valve. In the operation of these control valves, it has been the practice heretofore to provide the same with a small relief opening through which the actuating fluid is constantly being discharged, the purpose of such opening being to afford relief or leakage for the actuating fluid on the motor device when the control valve shuts off the supply.

The present invention has for an object the provision of a valve device wherein this constant waste of the actuating fluid is eliminated, there being but a minute loss which represents merely the actual loss on relief of the pressure. A further object of the invention resides in the provision of a valve device of this character which is simple and rugged in construction and wherein the change from one phase to the other is rapidly and effectively accomplished.

In carrying out the invention, a suitably designed valve casing is provided with an inlet and an outlet for the actuating fluid to be controlled thereby, the casing forming a chamber having a valve seat between the said inlet and outlet. Means, such as a ball, is provided to rest upon the seat to seal off the said communication between the inlet and outlet, and a movable means, such as a hollow stem, is slidably mounted in the casing for movement in a direction toward the ball, its inner end being adapted to engage with the ball to unseat it and thereby permit fluid to flow through the valve.

At the same time, the ball thus picked up bodily by the inner end of the stem seals said inner end so that the fluid will then not be caused to also discharge through the stem.

When the stem is depressed, preferably dropping under the action of gravity, the ball returns to the seat to seal off the communication; but the arrangement is such that the stem drops sufficiently below the seat and ball to entirely clear the same and exposing its open inner end to the portion of the chamber which is in communication with the outlet. The trapped fluid between the motor device and the valve may then pass through the stem, being discharged from its outer end which may be in communication with the external atmosphere or other air receiver. Suitable means, such as a tappet and actuated in any well known or special manner, may be caused to engage the outer end of the stem for control of the valve.

The nature of the invention, however, will best be understood when described in connection with the accompanying drawing, in which:

Fig. 1 is a vertical section through the novel valve device.

Fig. 2 is a transverse section through the valve device, taken on the line 2—2, Fig. 1, and looking in the direction of the arrows.

Fig. 3 is a fragmentary vertical section illustrating a modification.

Fig. 4 is a transverse section taken on the line 4—4, Fig. 3, and looking in the direction of the arrows.

Referring to the drawing, 10 designates a suitable casing affording a chamber having the upper and enlarged diameter portion 11 and the lower or reduced diameter portion 12 which is provided also with the seat 13.

A removable cap 14 is arranged to be screwed over the casing to seal the same at the top, and an inlet 15 is provided to the chamber portion 11 while an outlet 16 communicates with the chamber portion 12. A fluid under the desired pressure may be suitably introduced into the valve device, for control thereby, through the connection 17 to the inlet 15, and discharges from the valve through a connection 18 to the outlet 16.

A valve seat 20 is provided intermediate the inlet and outlet, for example, in the casing at the bottom of the chamber portion 11, and suitable movable sealing means such as the ball 21 is adapted to rest thereon for sealing off the communication between said inlet and outlet. Where the valve device is not intended for use in a vertical position, a suitable interposed spring element (not shown) may, of course, be arranged to hold normally a ball 21 to its seat.

In the position indicated by the full lines, Fig. 1 of the drawing, no fluid passes through the valve device, and provision is made for lifting ball 21 off its seat in order to open communication between the inlet connection 17 and outlet connection 18. As indicated, there is provided in the chamber portion 12 a movably mounted means such as the hollow stem 22 whose upper portion is of somewhat larger diameter than the lower portion to provide a shoulder 23 adapted to rest upon the seat 13 under the action of gravity, and thus position the inner end of the stem or tubular member 22 with reference to ball 21 and its seat 20. That is to say, a small clear space 24 is left between the said inner end of the stem and the ball and seat. The upper larger portion of the stem, furthermore, does not fit tightly within the upper end of chamber portion 12 but provides for a free surrounding space 25 which affords a relief communication for the outlet 16, to the external atmosphere, or other air receiver, as through openings 26 in the lower end of the stem.

Thus, if the pipe or outlet connection 18 be connected with a diaphragm or "servo-motor" apparatus, operated by the fluid supplied or withheld by the valve device, any residual fluid acting on said apparatus will be relieved or exhausted through the aforesaid communication when ball 21 is seated to shut off the supply.

At other times, when the ball is lifted off its seat 20, in manner hereinafter set forth, and fluid is being supplied through the inlet pipe 17, the valve device and the outlet pipe 18, the stem 22 is arranged to be sealed to provide against any loss of fluid therethrough or about the same. The only wastage then will be the actual volume of fluid relieved when the valve device closes off communication between the inlet pipe 17 and outlet pipe 18.

To effect this unseating of valve piece or ball 21, the stem 22 is slidably mounted in the casing, or rather the elongated extension 27 thereof, and its lower end sealed substantially through the elongated bearing 28 afforded thereby. It will be understood that by suitably elevating the stem 22, its inner end may be caused to engage with and unseat the said ball 21 moving it to the position shown in dotted lines. This may be effected in any convenient manner, for example, by means of the tappet 29 operated from an oscillating or rotating member as the shaft 30.

Simultaneously with the unseating of the ball 21, and through engagement of said ball with the inner end of the stem, the bore of the stem is sealed at the upper end and thus no fluid will escape through the said bore to the external atmosphere, nor will any appreciable amount leak at any time through the elongated bearing 28 in which the lower portion of the stem rides.

In Figs. 3 and 4 a slight modification is illustrated in connection with the manner of limiting the downward movement of the actuating hollow stem 35, which moves downwardly in both instances under the action of gravity, being restrained in the hereinbefore described embodiment through contact between the shoulder 23 and seat 13. As shown in Fig. 3, the bore of the casing 36 is uniform over its lowermost portion and the portion surrounding the upper part of the actuating stem. The upper portion of the stem in this embodiment, however, is of reduced diameter to provide a surrounding outlet chamber 37 with which communicates the outlet pipe 38. In order then to limit the downward movement of the stem, its extreme outer portion may be reduced to provide the shoulder 39 thereon adapted to engage with the tines 40 of a suitable forked bracket which may be secured to the casing 36.

I claim:

1. A fluid controlling valve, comprising a casing provided with a longitudinal passageway having a valve seat at its inner portion and the casing having an inlet at the entrance side of the seat and an outlet beyond the seat, a ball adapted to rest upon the valve seat to shut off communication between the inlet and outlet, and means movably mounted in the casing to engage and thereby unseat the ball, said movably mounted means when not engaging the said ball affording a relief communication for the casing outlet.

2. A fluid controlling valve, comprising a casing provided with a longitudinal passageway having a valve seat at its inner portion and the casing having an inlet at the entrance side of the seat and an outlet beyond the seat, a ball adapted to rest upon the valve seat to shut off communication between the inlet and outlet, and a tubular stem movable in the casing, its inner end being adapted for engagement with the ball to unseat the same and simultaneously therewith to be sealed by said ball, the outer end of the stem being open to the external atmosphere and the inner end when not sealed in communication with the outlet.

3. A fluid controlling valve, comprising a casing provided with a longitudinal passageway having a valve seat at its inner portion and the casing having an inlet at the entrance side of the seat and an outlet beyond the seat, a ball adapted to rest upon the valve seat to shut off communication between the inlet and outlet, and a tubular stem having a limited longitudinal movement in the casing in a direction away from the seat and sufficient to position its inner end portion below the said seat and ball, the wall of the casing about said inner end portion being spaced from the stem to afford a surrounding chamber in communication with the outlet, and the tubular stem being movable in the opposite direction to engage and unseat the ball.

4. A fluid controlling valve, comprising a casing provided with a longitudinal passageway having a valve seat at its inner portion and the casing having an inlet at the entrance side of the seat and an outlet beyond the seat, a ball adapted to rest upon the valve seat to shut off communication between the inlet and outlet, a tubular stem having a limited longitudinal movement in the casing in a direction away from the seat and sufficient to position its inner end portion below the said seat and ball, the wall of the casing about said inner end portion being spaced from the stem to afford a surrounding chamber in communication with the outlet, and means to move the stem toward said seat to cause its inner end to engage with the ball for unseating the latter and to receive the ball for sealing the said inner end of the stem.

In testimony whereof I affix my signature.

PERRY A. BORDEN.